(12) United States Patent
Gauger et al.

(10) Patent No.: US 12,310,534 B2
(45) Date of Patent: *May 27, 2025

(54) AUTOMATED BUN HANDLING AND TOASTING SYSTEM AND METHOD

(71) Applicant: A. J. ANTUNES & CO., Carol Stream, IL (US)

(72) Inventors: Steve Gauger, Crystal Lake, IL (US); Chad Elliott, Naperville, IL (US); David Anchor, Union, IL (US)

(73) Assignee: A. J. ANTUNES & CO., Carol Stream, IL (US)

( * ) Notice: Subject to any disclaimer, the term of this patent is extended or adjusted under 35 U.S.C. 154(b) by 594 days.

This patent is subject to a terminal disclaimer.

(21) Appl. No.: 17/350,246

(22) Filed: Jun. 17, 2021

(65) Prior Publication Data

US 2021/0393079 A1 Dec. 23, 2021

Related U.S. Application Data

(60) Provisional application No. 63/040,031, filed on Jun. 17, 2020.

(51) Int. Cl.
*A47J 37/08* (2006.01)
*A21B 1/42* (2006.01)
(Continued)

(52) U.S. Cl.
CPC ............ *A47J 37/0864* (2013.01); *A21B 1/42* (2013.01); *A21B 3/07* (2013.01); *A21C 15/00* (2013.01);
(Continued)

(58) Field of Classification Search
CPC .... A21B 1/42; A21B 1/46; A21B 3/07; A21B 5/02; A21C 15/00; A47J 36/32; A47J 37/0857; A47J 37/0864; A47J 37/0871; B65G 1/04; B65G 2201/0202; B65G 2203/0225; G06Q 50/12
(Continued)

(56) References Cited

U.S. PATENT DOCUMENTS 4,530,276 A * 7/1985 Miller ................... A47J 37/044
99/393
5,493,958 A * 2/1996 Naramura .............. A21C 15/02
99/357
(Continued)

*Primary Examiner* — Steven W Crabb
*Assistant Examiner* — Ket D Dang
(74) *Attorney, Agent, or Firm* — LAWOFFICES OF STEVEN W. WEINRIEB

(57) ABSTRACT

A new and improved automated bun handling and toasting system and method are disclosed comprising a plurality of horizontally oriented bun storage tubes mounted upon a carousel, and an indexing system operatively connected to the carousel so as to rotate the carousel in a predetermined incremental manner and thereby dispose a particular one of the plurality of horizontally oriented bun storage tubes at a predetermined discharge position such that a bun can be discharged from the particular bun storage tube. The discharged bun has a vertical orientation, however, a bun separator separates the bun into its crown and heel bun segments which then attain horizontal orientations with the internal surface portions facing upwardly so as to pass through a toaster appliance so as to be toasted.

24 Claims, 8 Drawing Sheets

(51) Int. Cl.
  *A21B 3/07*   (2006.01)
  *A21C 15/00*   (2006.01)
  *A47J 36/32*   (2006.01)
  *B65G 1/04*   (2006.01)
  *G06Q 50/12*   (2012.01)

(52) U.S. Cl.
  CPC ........... *A47J 36/32* (2013.01); *A47J 37/0857* (2013.01); *A47J 37/0871* (2013.01); *B65G 1/04* (2013.01); *B65G 2201/0202* (2013.01); *B65G 2203/0225* (2013.01); *G06Q 50/12* (2013.01)

(58) Field of Classification Search
  USPC .......................................................... 99/393
  See application file for complete search history.

(56) References Cited

U.S. PATENT DOCUMENTS

| | | |
|---|---|---|
| 5,562,183 A | 10/1996 | Naramura |
| 6,619,503 B2 | 9/2003 | Kofman et al. |
| 9,049,875 B2 * | 6/2015 | Ewald ................. A23L 5/15 |
| 10,086,525 B2 | 10/2018 | Engel-Hall et al. |
| 10,945,562 B2 | 3/2021 | Bauer et al. |
| 11,089,905 B2 * | 8/2021 | Gauger ............ A47J 37/0871 |
| 2004/0208961 A1 | 10/2004 | Reckert et al. |
| 2016/0183728 A1 | 6/2016 | Moma et al. |
| 2019/0167040 A1 | 6/2019 | Bauer et al. |
| 2019/0208793 A1 | 7/2019 | Bauer et al. |
| 2019/0208927 A1 | 7/2019 | Veltrop et al. |
| 2020/0121128 A1 | 4/2020 | Gauger et al. |
| 2020/0305640 A1 | 10/2020 | Bauer et al. |

* cited by examiner

AUTOMATED BUN HANDLING AND TOASTING SYSTEM AND METHOD

CROSS-REFERENCE TO RELATED PATENT APPLICATION

This patent application is a non-provisional conversion of U.S. Provisional Patent Application Ser. No. 63/040,031 which was filed on Jun. 17, 2020, the priority benefits of which are hereby claimed.

The present invention relates generally to food service equipment, and more particularly to a new and improved automated bun handling and toasting system and method which is to be utilized in restaurants, particularly fast-food restaurants, in order to quickly and accurately prepare food products, such as, for example, conventional hamburger sandwiches in accordance with specific patron orders.

BACKGROUND OF THE INVENTION

Conventionally, when preparing specific food orders, particularly in a fast-food restaurant, food preparation personnel must infeed the food products, to be cooked, toasted, or the like, in an individual or one-by-one manner into the particular cooking or toasting appliance, and in a similar manner, must likewise remove the food products in an individual or one-by-one manner from the particular cooking or toasting appliance. Obviously, such food preparation, cooking, or toasting procedures are very inefficient, time consuming, and labor intensive, particularly for fast-food restaurants wherein quick or rapid cooking or toasting food preparation times are required or desirable in order to produce the cooked or toasted food products within relatively short service times which effectively define one of the more important and attractive features or characteristics of fast-food establishments.

A need therefore exists in the art for a new and improved piece of food service equipment. An additional need exists in the art for a new and improved piece of food service equipment which is adapted to prepare, cook, or toast specific food items. A still additional need exists in the art for a new and improved piece of food service equipment which is adapted to prepare, cook, or toast buns for hamburgers and the like. A yet additional need exists in the art for a new and improved piece of food service equipment which can be utilized in various different food establishments. A still yet additional need exists in the art for a new and improved piece of food service equipment which can be utilized in various different food establishments, such as, for example, fast food restaurants. A further need exists in the art for a new and improved piece of food service equipment which can be utilized in various different food establishments, such as, for example, fast food restaurants, wherein quick turnaround time for cooking or preparing food item orders is a highly sought-after feature or characteristic. A still further need exists in the art for a new and piece of improved food service equipment which can be utilized in various different food establishments, such as, for example, fast food restaurants, wherein the equipment is very compact yet efficient in providing the cooked food products. A yet further need exists in the art for a new and improved piece of food service equipment which can be utilized in various different food establishments, such as, for example, fast food restaurants, wherein the appliance is very compact, efficient in providing the cooked food products, and can be operated by means of a minimum number of food preparation personnel. A still yet further need exists in the art for a new and improved piece of food service equipment which can be utilized in various different food establishments, such as, for example, fast food restaurants, wherein the equipment is very compact, efficient in providing the cooked food products, can be easily operated by means of a minimum number of food preparation personnel, and can be utilized to prepare, cook, or toast numerous food items substantially as opposed to being constrained to process the food items singly, or in a one-by-one fashion. A yet still further need exists in the art for a new and improved piece of food service equipment which can be utilized in various different food establishments, such as, for example, fast food restaurants, wherein numerous food items can effectively be pre-loaded into the equipment, particularly during lull or relatively slow business hours or times, such that the plurality of food items will then be substantially immediately available for order processing as orders are inputted into the system for patrons at a "point-of-sale" (POS) location as opposed to being constrained to process the food items singly, or in a one-by-one fashion.

OVERALL OBJECTIVES OF THE PRESENT INVENTION

A primary objective of the present invention is to provide a new and improved piece of food service equipment. An additional objective of the present invention is to provide a new and improved piece of food service equipment which is adapted to prepare, cook, or toast specific food items. A still additional objective of the present invention is to provide a new and improved piece of food service equipment which is adapted to prepare, cook, or toast buns for hamburgers and the like. A yet additional objective of the present invention is to provide a new and improved piece of food service equipment which can be utilized in various different food establishments. A still yet additional objective of the present invention is to provide a new and improved piece of food service equipment which can be utilized in various different food establishments, such as, for example, fast food restaurants. A further objective of the present invention is to provide a new and improved piece of food service equipment which can be utilized in various different food establishments, such as, for example, fast food restaurants, wherein quick turnaround time for cooking or preparing food item orders is a highly sought-after feature or characteristic. A still further objective of the present invention is to provide a new and piece of improved food service equipment which can be utilized in various different food establishments, such as, for example, fast food restaurants, wherein the equipment is very compact yet efficient in providing the cooked food products.

A yet further objective of the present invention is to provide a new and improved piece of food service equipment which can be utilized in various different food establishments, such as, for example, fast food restaurants, wherein the appliance is very compact, efficient in providing the cooked food products, and can be operated by means of a minimum number of food preparation personnel. A still yet further objective of the present invention is to provide a new and improved piece of food service equipment which can be utilized in various different food establishments, such as, for example, fast food restaurants, wherein the equipment is very compact, efficient in providing the cooked food products, can be easily operated by means of a minimum number of food preparation personnel, and can be utilized to prepare, cook, or toast numerous food items substantially as opposed to being constrained to process the food items singly, or in a one-by-one fashion. A yet still further objective of the present invention is to provide a new and improved piece of food service equipment which can be utilized in various different food establishments, such as, for example, fast food restaurants, wherein numerous food items can effectively be pre-loaded into the equipment, particularly during lull or relatively slow business hours or times, such that the plurality of food items will then be substantially immediately available for order processing as orders are inputted into the system for patrons at a "point-of-sale" (POS) location as opposed to being constrained to process the food items singly, or in a one-by-one fashion.

SUMMARY OF THE INVENTION

The foregoing and other objectives of the present invention are achieved in accordance with a bun handling and toasting system wherein food buns are stored within a plurality of horizontally oriented bun storage tubes which are disposed within a circular array or carousel which is rotated around a horizontal axis. The carousel may comprise a predetermined number of bun storage tubes such as, for example, eight bun storage tubes, or alternatively, twelve bun storage tubes, or any number of bun storage tubes that would be deemed best for a particular food establishment. All of the bun storage tubes may store the same type of bun so that a large supply of a particular bun is always ready for use in connection with the preparation of hamburger sandwiches, quarter-pounder sandwiches, Big Macs®, Whoppers®, and the like. Alternatively, each bun storage tube may contain a different type of bun such as, for example, a two-piece bun for regular hamburgers, a three-piece bun for a Big Mac®, or different buns made from different dough ingredients, such as, for example, brioche buns, potato buns, sourdough buns, and the like. It is to be noted that each bun comprises, in the simplest case, two bun halves, such as, for example, a crown portion and a heel portion. A Geneva drive mechanism is operatively connected to the carousel so as to advance the carousel a predetermined distance along the circular locus defining the circular carousel such that a particular one of the bun storage tubes is located at a predetermined discharge position.

Once a particular bun storage tube is located at the predetermined discharge position, a pusher block will be actuated so as to engage the rear bun of the plurality of buns stored within the bun storage tube so as to cause the leading bun disposed within the bun storage tube to be discharged from the front end of the bun storage tube such that the discharged bun is disposed within a vertical or upright orientation similar to the disposition of the plurality of buns when disposed within the bun storage tube. The discharged bun will then encounter a circular positioning disc such that the discharged bun is disposed at a predetermined position so as to be engaged by a sheet metal pusher mechanism, oriented perpendicular to the longitudinal axis of the bun storage tube, which will then push the bun along a first longitudinal track or platform which extends between a pair of laterally spaced vertical guide plates. A second horizontally oriented platform is disposed immediately downstream of the first longitudinal track or platform such that the sheet metal pusher mechanism can effectively push the discharged bun from the first longitudinal track or platform onto the second horizontally oriented platform. The second horizontally oriented platform has a pair of laterally spaced longitudinal slots defined therein which are adapted to accommodate a pair of vertically movable guide plates when the pair of vertically movable guide plates are moved to their raised or elevated positions. More particularly, the forward or leading end of the discharged bun will enter the pair of vertically movable guide plates while the rear end of the bun is still located between the first pair of vertically oriented guide plates disposed upon opposite sides of the first longitudinal track or platform located therebetween. In this manner, the bun can never fall over towards one side and is retained within its vertical or upright orientation.

A bun separator mechanism is disposed above the second horizontally oriented platform and comprises a pair of flexible bands which are adapted to respectively engage an upper circumferential segment of each bun half of the bun while the bun is maintained within its vertical or upright orientation as a result of being interposed between the pair of vertically movable guide plates. The use of the pair of flexible bands as part of the separator mechanism enables the pair of flexible bands to respectively grip an upper circumferential segment of each bun half. Accordingly, once the pair of flexible bands have engaged and effectively gripped the upper circumferential segments of the bun halves, the pair of vertically movable guide plates are moved to their lowered positions, and the flexible bands are moved laterally away from each other so as to permit the bun halves to now fall onto the second horizontally oriented platform into horizontal orientations with the flat internal faces of the bun segments facing upwardly. A rake mechanism, operatively associated with the second horizontally oriented platform will then be moved so as to push the two bun segments off the second horizontally oriented platform and onto a downwardly extending tilted ramp which will lead to one end of an endless conveyor which will transport the two bun segments through a toasting mechanism so as to toast the bun segments to a predetermined degree.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
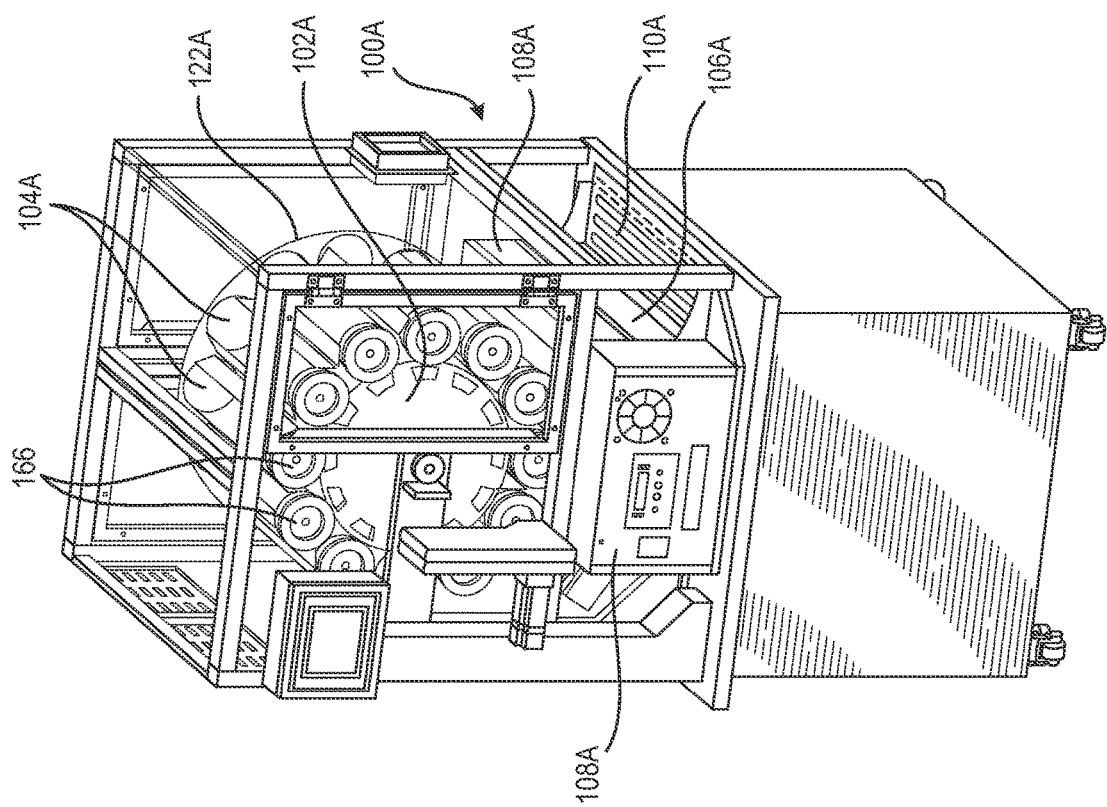
FIG. 1 is a rear, left side, top perspective view of a first embodiment of a new and improved automated bun handling and toasting system as constructed in accordance with the teachings and principles of the present invention.
Figure 1A:
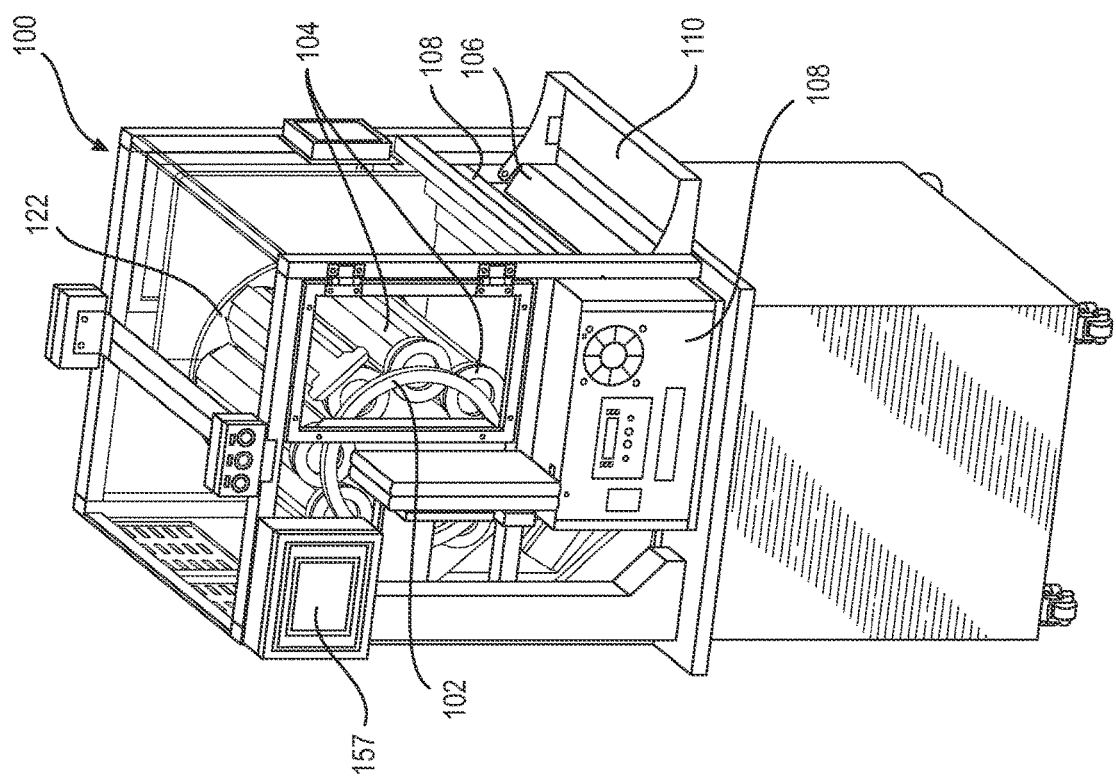
FIG. 1A is a rear, left side, top perspective view of a second embodiment of a new and improved automated bun handling and toasting system as constructed in accordance with the teachings and principles of the present invention.

Referring now to the drawings, and more particularly to FIG. 1 thereof, there is disclosed a first embodiment of a new and improved automated bun handling and toasting system which has been constructed in accordance with the principles and teachings of the present invention and which is generally indicated by the reference character 100. More particularly, and as will be further appreciated in view of the more detailed disclosure which will follow, it is briefly seen that the new and improved automated bun handling and toasting system 100 comprises a carousel 102 which is rotatable around a horizontal axis, and the carousel is provided with a plurality of bun storage tubes 104 which are disposed upon the carousel in a circular array defining a circular locus extending around the horizontal axis of the carousel 102 wherein the axis of the circular locus of the circular array of bun storage tubes 104 coincides with the horizontal axis of the carousel 102. In this particular first embodiment of the new and improved automated bun handling and toasting system 100, the carousel 102 houses eight (8) bun storage tubes 104, however, in accordance with a second embodiment of the new and improved automated bun handling and toasting system, as disclosed within FIG. 1A, and denoted by the reference character 100A, the carousel 102A houses twelve (12) bun storage tubes 104A. It is noted that particular components of the second new and improved automated bun handling and toasting system 100A that correspond to similar components of the first new and improved automated bun handling and toasting system 100 will be designated by corresponding reference numbers except that they will have an "A" added to the reference numbers.

It is also noted that the particular number of bun storage tubes that can be mounted upon a particular carousel in accordance with the principles and teachings of the new and improved automated bun handling and toasting system of the present invention may vary, but for the purposes of the detailed description of the present invention, reference will effectively be directed toward the first embodiment wherein the carousel 102 has eight (8) bun storage tubes 104 disposed thereon. As will be more fully appreciated from the detailed description of the new and improved automated bun handling and toasting system 100 of the present invention, buns will be discharged from particular bun storage tubes 104, will be conveyed onto a horizontally oriented conveyor 106 which will convey the buns through a toasting mechanism 108, and will be discharged onto a toasted-bun collection tray 110 from which restaurant personnel can retrieve the same in connection with the preparation of a particular food order.

Figure 2:
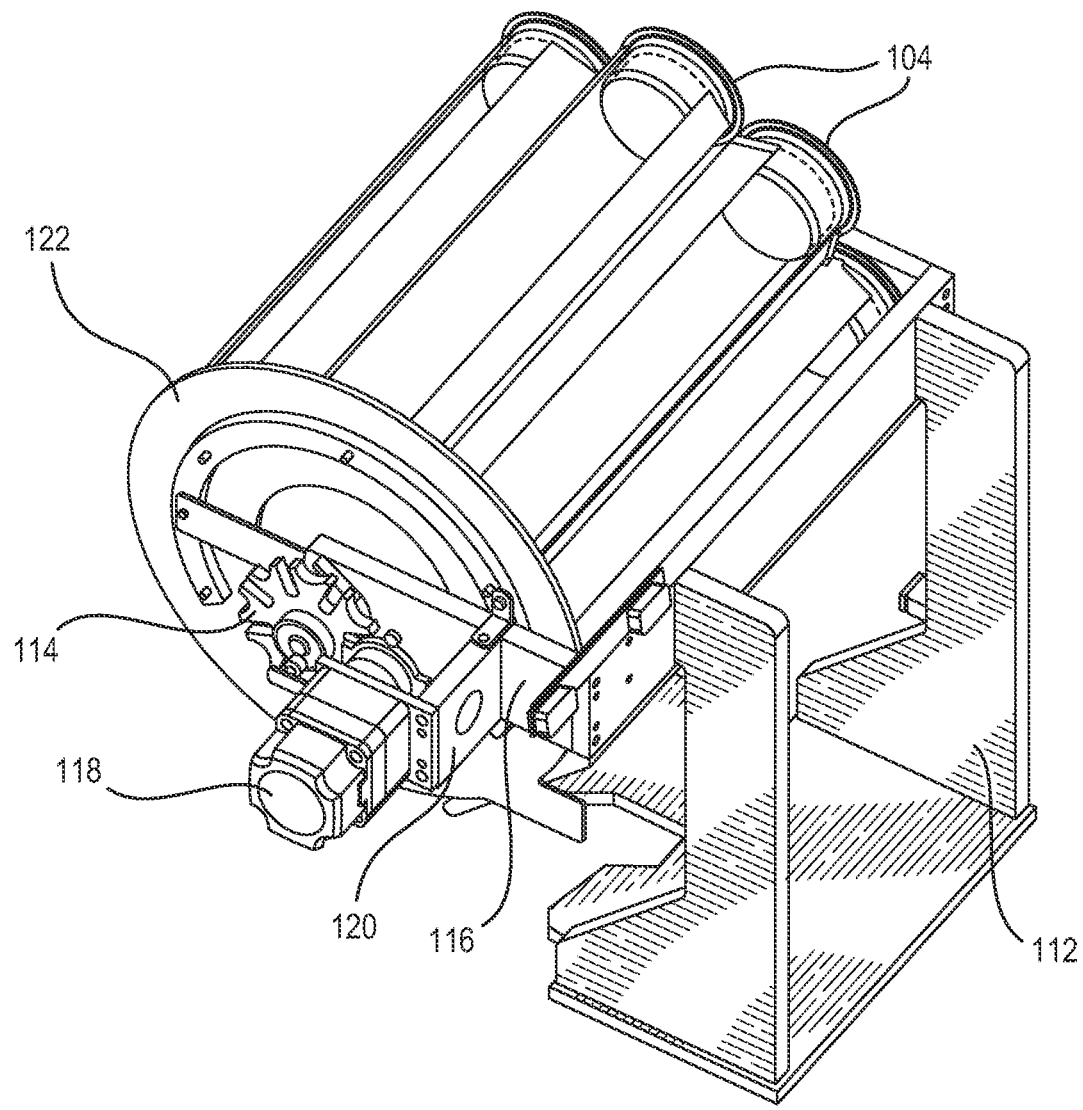
FIG. 2 is a front, right side, perspective view of the carousel of the new and improved automated bun handling and toasting system of the present invention as rotatably mounted upon its mounting bracket or standard.
Figure 3:
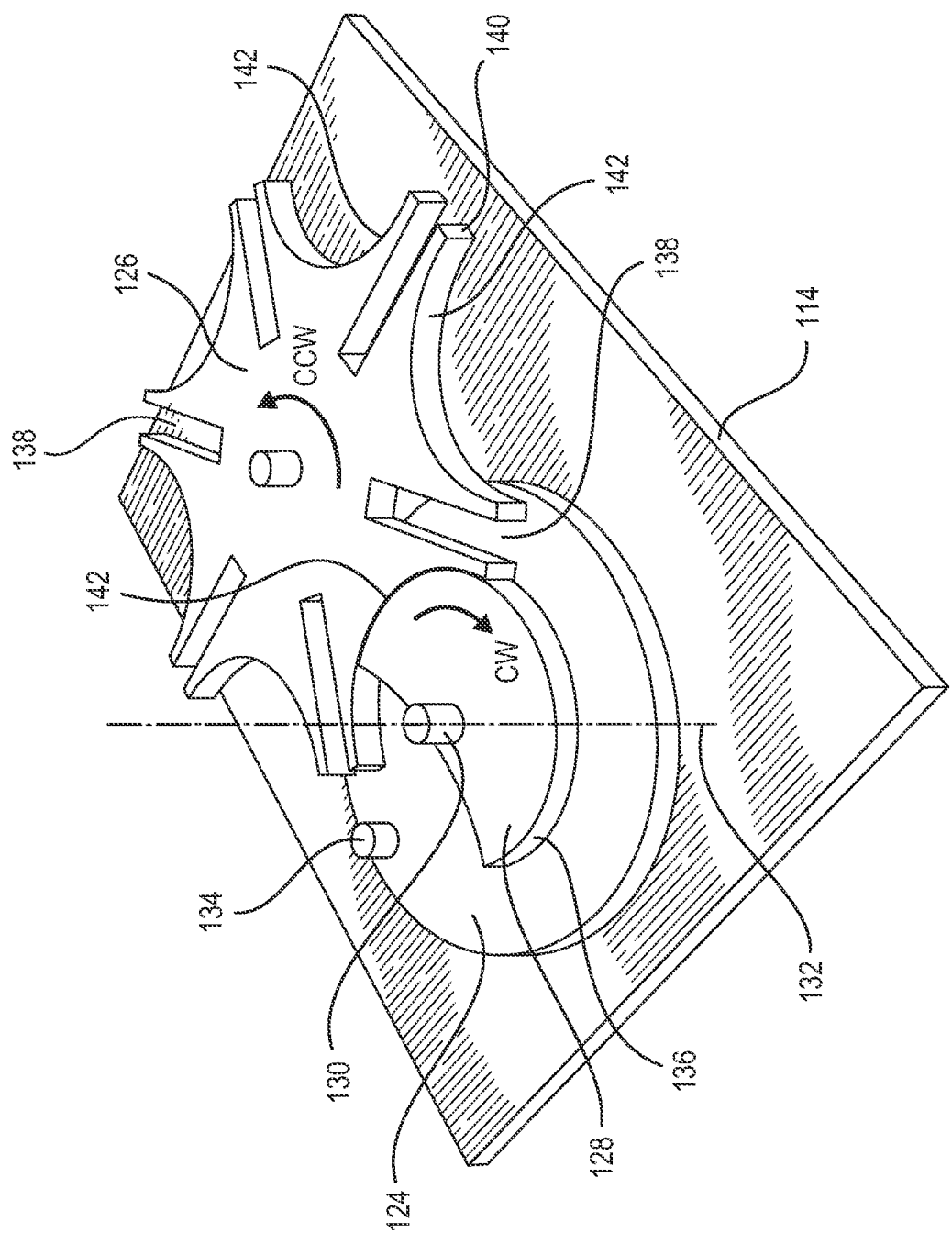
FIG. 3 is a schematic view of a Geneva drive mechanism so as to clearly illustrate how a Geneva drive mechanism effectively converts continuous rotary motion of a rotary driving component into intermittent angular positions of a rotary driven component.
Figure 4:
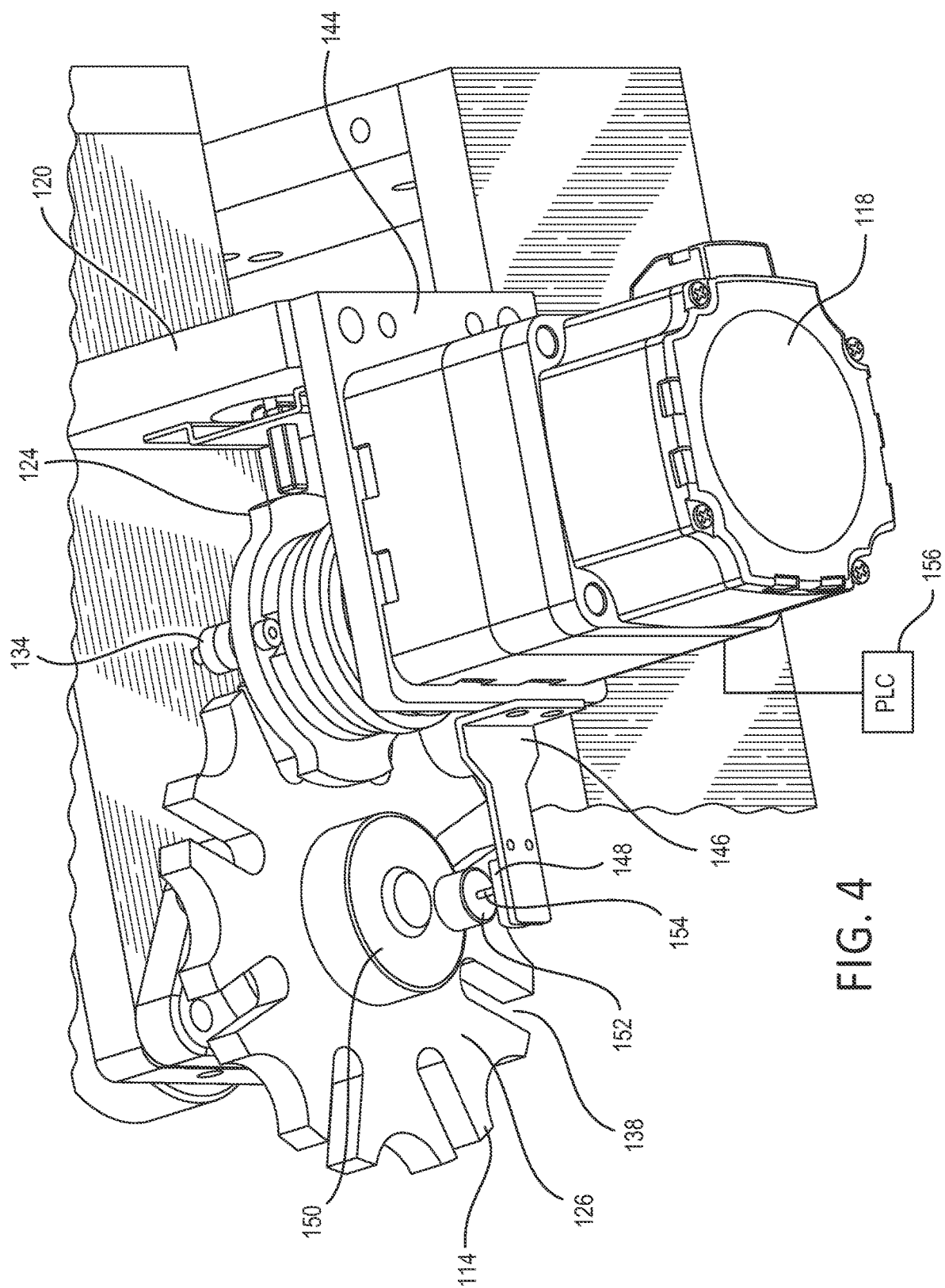
FIG. 4 is an enlarged view of the Geneva drive mechanism and its drive motor as illustrated within FIG. 2.
Figure 5:
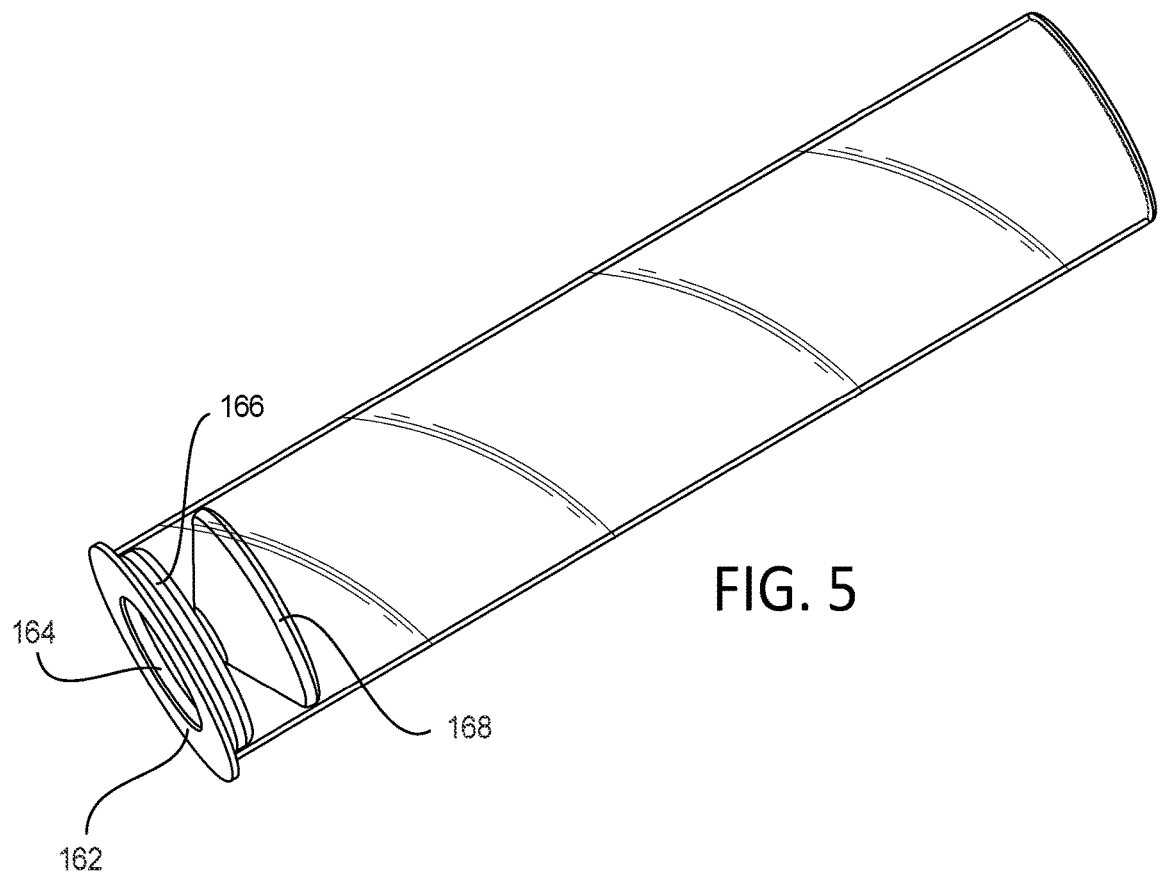
FIG. 5 is an external perspective view of one of the bun storage tubes.

With reference now being made to FIGS. 2-4, it is seen that the carousel 102 is rotatably mounted upon an upstanding mounting bracket or standard 112 by means of a suitable structural framework, not shown, and that a Geneva drive mechanism 114 is rotatably mounted upon a horizontally extending arm 116 of the mounting bracket 112. A drive motor 118, which is operatively connected to the Geneva drive mechanism 114, is fixedly mounted upon a mounting bracket 120 which is also fixedly mounted to the horizontally extending arm 116 of the mounting bracket 112. Still further, it is to be noted that the front ends of the bun storage tubes 104, from which the buns are periodically discharged, are open, and accordingly, an annular disc or plate 122 is also fixedly mounted upon the horizontally extending arm 116 of the mounting bracket 112. Accordingly, it is to be appreciated that the annular disc or plate 122 effectively covers all of the open ends of all of the bun storage tubes 104 mounted upon the carousel 102, so that the buns cannot be accidentally or inadvertently discharged, or free fall, from one of the bun storage tubes 104, except for the bun storage tube 104 that would be located at the six o'clock position as viewed in FIG. 2, although such bun storage tube is not visible. At this position, the annular disc or plate 122 is provided with a through-opening, not shown, through which the leading or forwardmost bun disposed within that particular bun storage tube, also not shown, will be discharged from the bun storage tube as will be more fully appreciated from the description provided later on in this disclosure. This position is noted as the HOME position to which each bun storage tube 104 will be moved when it is desired to discharge a bun from that particular bun storage tube 104.

With reference being made to FIGS. 3 and 4, a Geneva drive mechanism, similar to the Geneva drive mechanism 114 shown in FIGS. 2 and 4, is disclosed. A Geneva drive mechanism, or Maltese Cross as it is sometimes referred to, is a gear mechanism which is designed to translate or convert continuous rotary motion or rotational movement into intermittent rotary motion or rotational movement. More particularly, it is seen that the Geneva drive mechanism 114 comprises a primary rotational drive wheel 124, and a secondary rotational slotted driven wheel 126. A substantially semi-circular disc 128 is fixedly mounted atop the primary rotational drive wheel 124 such that both the primary rotational drive wheel 124 and the substantially semi-circular disc 128 are coaxially mounted around a rotary axle 130 which defines the rotary axis 132 around which both the primary rotational drive wheel 124 and the substantially semi-circular disc 128 rotate. It is also seen that the primary rotational drive wheel 124 has an axially extending pin 134 near a circumferential edge portion of the primary rotational drive wheel 124, while the substantially semi-circular disc 128 has a substantially semi-circular peripheral edge portion 136. In turn, it is seen that the secondary rotational slotted driven wheel 126 has, for example, as illustrated within FIG. 3, six (6) radially extending slots 138 which extend radially inwardly from radially outer peripheral edge portions 140 of the secondary rotational slotted driven wheel 126, and also has six substantially semi-circular, radially inwardly extending arcuate segments 142 which are adapted to accommodate the substantially semi-circular disc portion 128 disposed atop the primary rotational drive wheel 124. Accordingly, it can be appreciated that as the primary rotational drive wheel 124 is rotated, such as, for example, in the clockwise direction as indicated by the arrow CW, the substantially semi-circular disc portion 128 will rotate within one of the substantially semi-circular arcuate segments of the secondary rotational slotted driven wheel 126 while the pin 134 of the primary rotational drive wheel 124 enters one of the radially extending slots 138 of the secondary rotational slotted driven wheel 126 so as to cause the secondary rotational slotted driven wheel 126 to rotate through a predetermined arcuate movement in the counterclockwise direction as indicated by means of the arrow CCW as the primary rotational drive wheel 124 continues to rotate in the clockwise direction. It can therefore be additionally appreciated that as the primary rotational drive wheel 124 is rotated continuously, the secondary rotational slotted driven wheel 126 will rotate intermittently or in a stepwise manner for each rotation of the primary rotational drive wheel 124. It is to be further appreciated that the provision of the substantially semi-circular disk 128 fixedly disposed atop the primary rotational drive wheel 124 effectively locks the secondary rotational slotted driven wheel 126 in place until the pin 134 of the primary rotational drive wheel 124 returns to the illustrated position so as to again enter one of the radially extending slots 138 of the secondary rotational driven wheel 126 and thereby rotate the secondary rotational driven wheel 126 through its next incremental rotational movement.

With reference therefore being made to FIG. 4, the various components of the Geneva drive mechanism 114, as used within the present invention system 100, is apparent, the rotary drive motor 118 being fixedly mounted upon a suitable mounting plate 144 and operatively connected to the primary rotational drive wheel 124, the mounting plate 144 being mounted upon the mounting bracket 120. It is also to be noted that in connection with the Geneva drive mechanism 114, an L-shaped mounting bracket 146 is mounted upon the left side of the mounting plate 144, as viewed within FIG. 4, and it is further seen that a proximity sensor 148 is mounted upon the distal end of the L-shaped mounting bracket 146. In addition, the second rotational driven wheel 126 of the Geneva drive mechanism 114 is provided with a relatively large, centrally located circular disk 150, while a relatively small circular disk 152 is mounted upon a peripheral edge portion of the relatively large, centrally located circular disk 150. The proximity sensor 148 continuously transmits a laser beam 154 which will be interrupted by the presence of the relatively small circular disk 152 when the Geneva mechanism 114 is rotated such that the relatively small circular disk 152 does in fact interrupt the laser beam 148. This occurrence generates a signal which identifies the fact that the carousel 102 has been rotated to the HOME position and that, in turn, the bun storage tube 104, from which buns can be discharged, is likewise at the HOME position.

Each time the automated bun handling and toasting system 100 is activated or turned ON, the Geneva drive system 114 will automatically rotate to its HOME position such that the angular position of a particular bun storage tube 104 is always known and is always disposed at the HOME position. This is significant in that since the angular disposition or location of the particular bun storage tube 104 is known, the positions of the other bun storage tubes 104, relative to the bun storage tube 104 disposed at the HOME position, is always known. This can be appreciated by the fact that the entire operation of the automated bun handling and toasting system 100 is under the control of a suitable programmable logic controller (PLC) 156. Accordingly, since the automated bun handling and toasting system 100 will always know which types of buns are located within which bun storage tubes 104, through means of data entered into the programmable logic controller (PLC) 156 by means of, for example, a user interface (UIF), as shown at 157 in FIG. 1, and will always place, for example, a particular one of the bun storage tubes 104 at the HOME position, wherein such bun storage tube 104 is designated as bun storage tube number one which contains a known or particular type of bun, then the programmable logic controller (PLC) 156 is able to control the carousel 102 of the automated bun handling and toasting system 100 so as to always position a proper bun storage tube 104 at the HOME position in accordance with patron orders which may also be placed by means of the user interface (UIF) 157. Lastly, it is to be noted that the second rotational driven wheel 126 of the Geneva drive system 114 as illustrated within FIG. 4 contains eight (8) radially extending slots 138 such that the second rotational driven wheel 126 of the Geneva drive system 114 will intermittently or incrementally rotate through eight arcuate steps which corresponds to the number of bun storage tubes 104 mounted upon the carousel 102 such that each bun storage tube 104 can be positioned at the HOME position at which the buns, disposed within the particular bun storage tube 104, may be dispensed. Still further, the Geneva drive motor 118 is of course reversible such that any particular bun storage tube 104 may be moved to the HOME position as quickly as possible.

Figure 6:
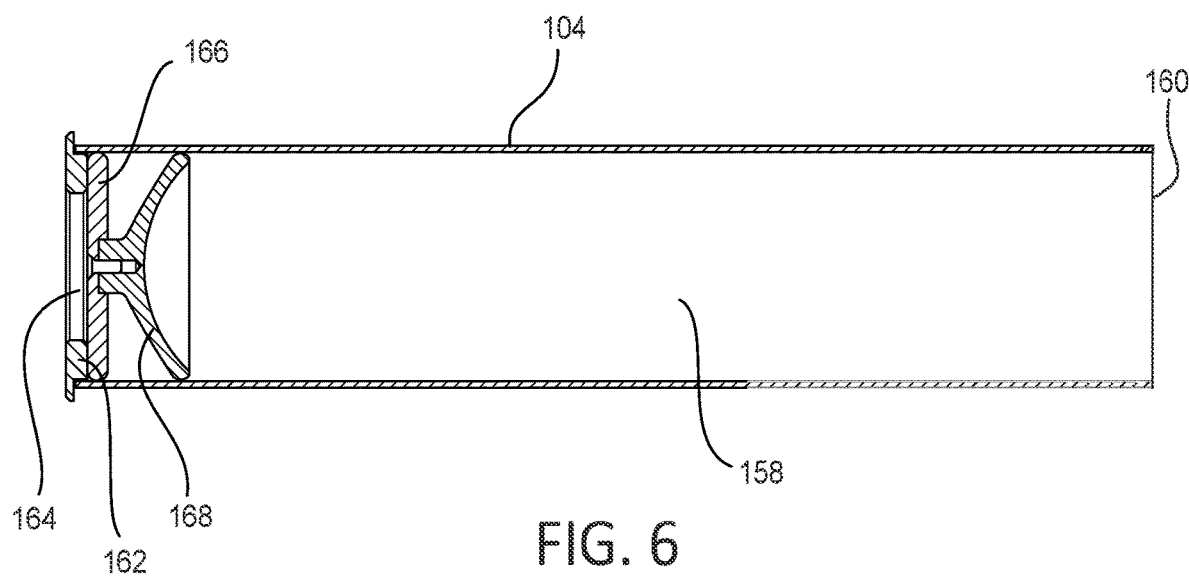
FIG. 6 is a longitudinal cross-sectional view of the bun storage tube disclosed within FIG. 5.

With reference now being made to FIGS. 5-8, a detailed description of one of the multitude or plurality of bun storage tubes 104 disposed within the automated bun handling and toasting system 100, and the use of a stepper motor to successively incrementally dispense the lead buns housed within a particular bun storage tube 104, will now be described. More particularly, it is seen that each bun storage tube 104 comprises a bun storage tube housing 158, within which a plurality of buns, not shown, are to be stored, an open front end 160, and an annular rear end cap 162 fixedly mounted upon the rear end of the bun storage tube housing 158. The annular rear end cap 162 is provided with a central opening 164, and that a bun tube puck 166 is disposed within the rear end portion of the bun storage tube 104 such that the leftwardmost surface portion of the bun tube puck 166 is engaged with an interior annular surface portion of the annular rear end cap 162, while the rightward portion 168 of the bun tube puck 166, which has a substantially arcuate or conical configuration as best seen in FIG. 6, is adapted to engage the trailing one of the plurality of buns, not shown, disposed within the bun storage tube 104. The bun tube puck 166 is adapted to be axially movable within the bun storage tube 104, in a precisely controlled incremental manner, so as to successively force or discharge the buns, not shown but disposed within the bun storage tube 104, out from the forward or discharge end of the bun storage tube 104.

Figure 8:
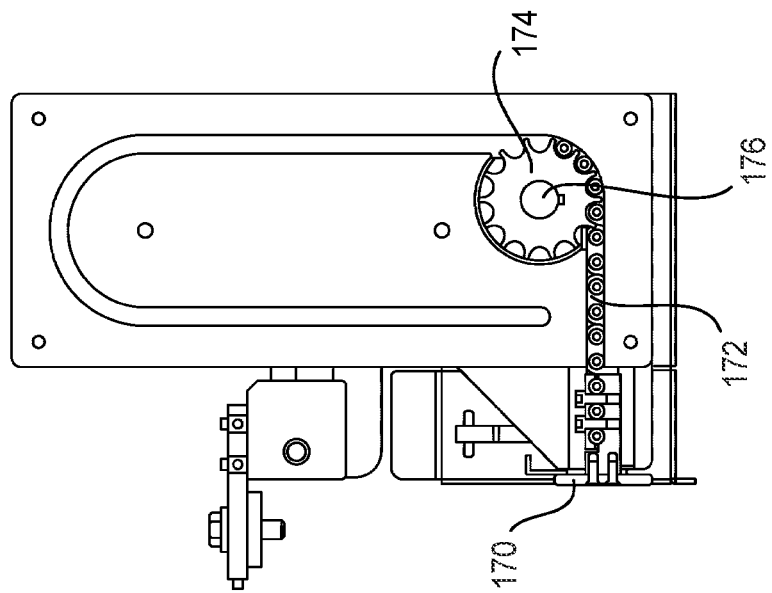
FIG. 8 is a cross-sectional view of the motor drive system as disclosed within FIG. 7.
Figure 7:
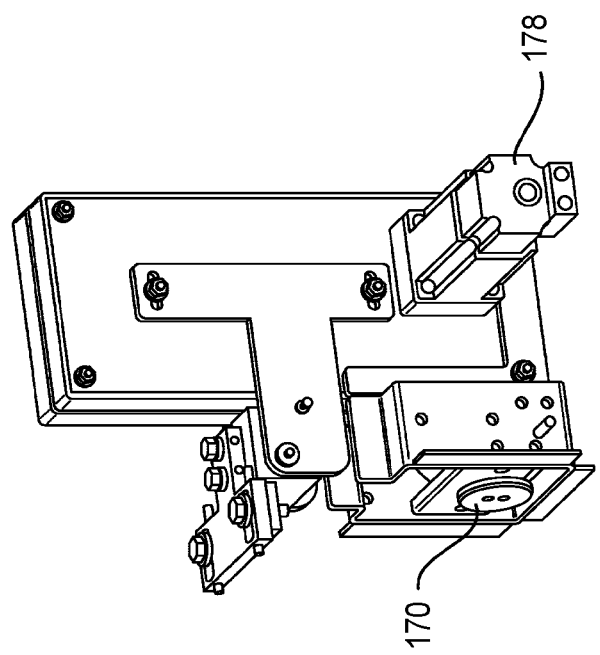
FIG. 7 is a schematic view disclosing the motor drive system utilized for moving the pusher block mechanism adapted to engage the rear end cap of the bun storage tube so as to incrementally advance the buns disposed within the bun storage tube for dispensing or discharge of the buns disposed within the bun storage tube.

In order to accomplish this incremental movement of the bun tube puck 166, a pusher block 170, as seen in FIGS. 7 and 8, is adapted to be inserted into the central opening 164 defined within the annular rear end cap 162 of the bun storage tube 104. The pusher block 170 is fixedly connected to one end of a rigid chain 172 which is adapted to be routed around a sprocket wheel 174 which is fixedly mounted upon the rotary shaft 176 of a stepper motor 178. It is to be noted that a rigid chain, such as that disclosed at 172, is well known in the art and effectively comprises a chain that can be bent or displaced in only one direction. So, for example, as illustrated within FIG. 8, while the rigid chain 172 can effectively be bent or coiled around the sprocket wheel 174 in a substantially counterclockwise manner as viewed within FIG. 8, the rigid chain 172 cannot be bent in the opposite direction. Therefore, as it extends from the sprocket wheel 174 to its fixed connection with the pusher block 170, the chain 172 will effectively remain rigid and linear, will act as a linear actuator, and will effectively impart linear movement to the pusher block 170 and, in turn, to the bun tube puck 166, as the stepper motor 178 causes its rotary drive shaft 176, and the sprocket wheel 174 fixedly mounted thereon, to rotate, so as to in fact cause the incremental successive discharge of buns, not shown, from the discharge end of the bun storage tube 104. It is to be understood that the motor drive 178 will be controlled by means of a rotary encoder, not shown, which will be under the control of the programmable logic controller (PLC) 156 so as to achieve the incremental movement and discharge of the buns, not shown, from the discharge end of the bun storage tube 104.

Figure 9:
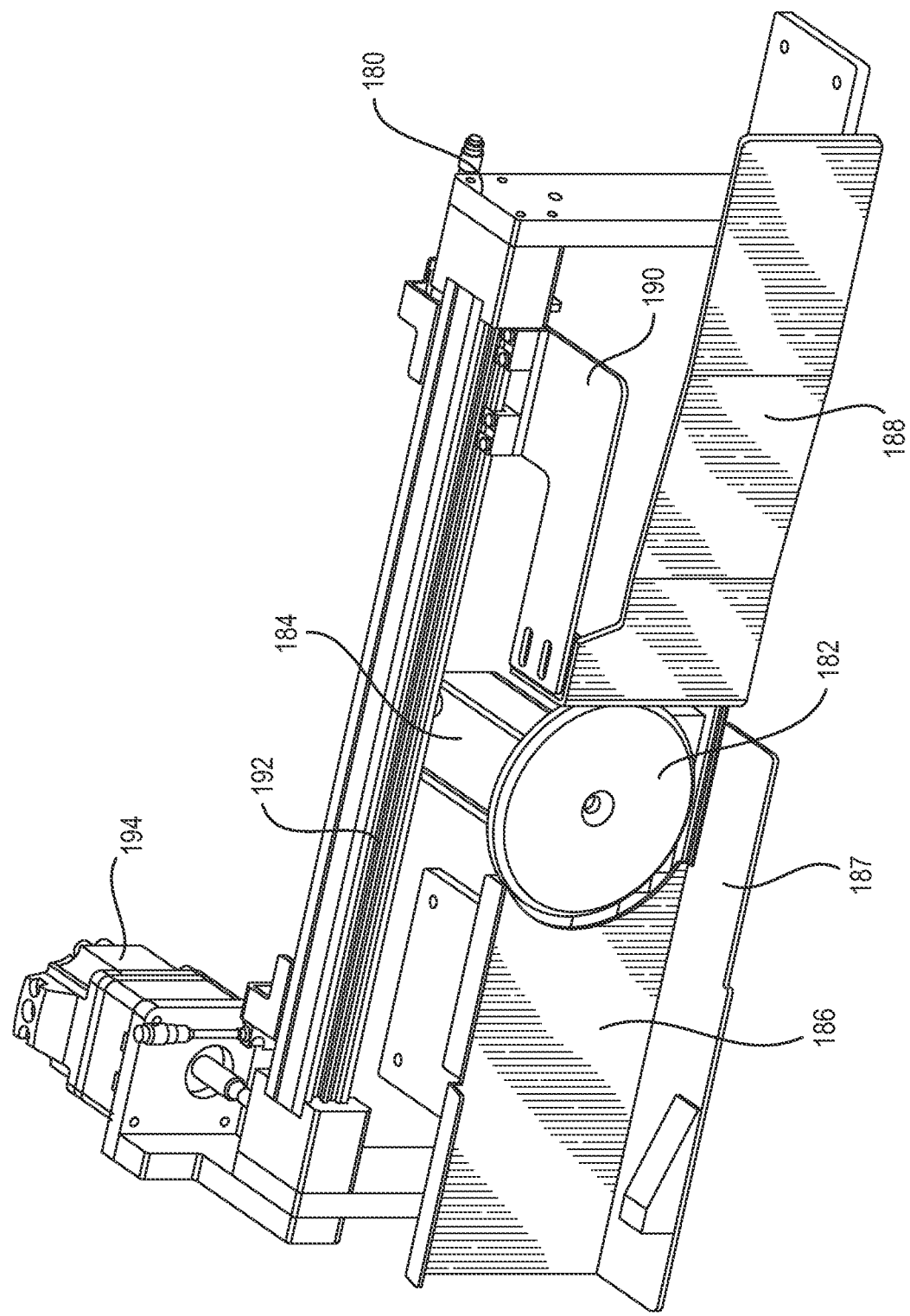
FIG. 9 is a perspective view of the bun pusher mechanism which will move or push a bun, discharged from the forward open end of a particular bun storage tube, toward a bun separator mechanism.

With reference now being made to FIG. 9, the pusher mechanism of the new and improved automated bun handling and toasting system 100 of the present invention will now be described, the pusher mechanism being indicated by means of the reference character 180 and utilized to move or push the leading bun, which has been discharged from the front open end of a particular storage tube 104 by means of the pusher block 170, toward a bun separator mechanism which will be discussed and described shortly. More particularly, as will be recalled, once the particular bun storage tube 104 has been disposed at the HOME position, which is considered to be at the six o'clock position as viewed within FIG. 2, the pusher block 170 pushes the buns, disposed within the particular bun storage tube 104, forward such that the first or leading bun is discharged from the bun storage tube 104 and through the hole, not shown, defined within the annular disk or plate 122 illustrated within FIG. 2. As seen in FIG. 9, a circular positioning disk 182, fixedly mounted upon the front end of a suitable actuator 184, such as, for example, an air cylinder, is positioned so as to immediately engage the bun that is being discharged from the bun storage tube 104 and moved through the hole defined within the annular disk or plate 122. Valving, not shown, disposed upon the air cylinder 184, is actuated such that the positioning disk 182 is able to move rearwardly a distance which is predetermined by means of one or more sensors, also not shown, located upon the air cylinder or actuator 184. When the positioning disk 182 has been moved rearwardly the predetermined distance, the discharged bun will be momentarily disposed at a predetermined WAIT or PAUSE position between the remaining buns in the bun storage tube 104, or the pusher block 170 if the bun is the last bun disposed within the bun storage tube 104, and the positioning disk 182. A first pair of vertically oriented guide plates 186, only one of which is visible in FIG. 9, are disposed upon one side of the positioning disk 182 and are spaced from each other by means of a distance corresponding to the thickness of the bun, discharged from the bun storage tube 104 and disposed at the WAIT or PAUSE position, so as to accommodate the discharged bun therebetween. Accordingly, a pusher plate 188, disposed upon the other side of the positioning disk 182, opposite the side at which the pair of vertical guide plates 186 are disposed, is adapted to push the discharge bun through the pair of vertical guide plates 186 and along a first horizontally oriented platform 187. It is to be noted that the bun discharged from the particular bun storage tube 104 is disposed in a vertical orientation with a peripheral edge portion of the bun disposed upon the platform 187. As is seen in FIG. 9, the pusher plate 188 is fixedly connected to an L-shaped mounting bracket 190, and the mounting bracket 190 is fixedly connected to one end of a suitable linear actuator 192, such as, for example, a linear chain actuator which is controlled by means of a suitable drive motor 194. After the pusher plate 188 has moved or pushed the discharged bun to its next position, the linear chain actuator 192 is actuated so as to return the pusher plate 188 to its position illustrated within FIG. 9, whereupon the air cylinder 184 is actuated so as to move the circular positioning disk 182 forwardly so as to be in a position adjacent to an open end of a bun storage tube 104 so as to engage another bun to be discharged from the same or another bun storage tube 104 when such a bun is to be discharged from a particular bun storage tube 104 by means of the pusher block 170.

Figure 10:
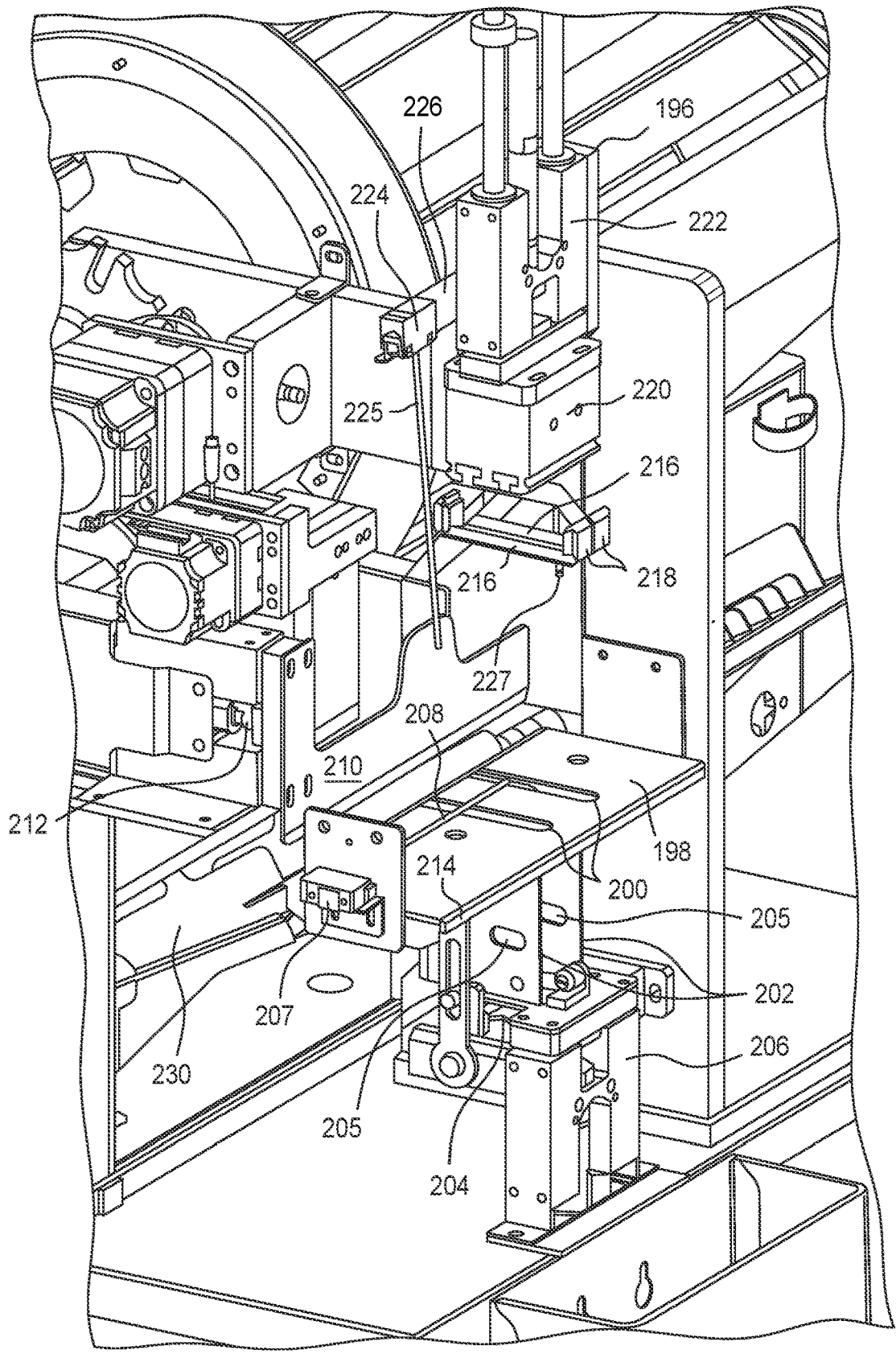
FIG. 10 is a perspective view of a bun separator mechanism which is utilized to separate the vertically oriented bun, that has been moved or pushed toward the bun separator mechanism, by the bun pusher mechanism illustrated within FIG. 9, so that the bun separator mechanism can separate the bun crown segment from the bun heel segment and permit the two crown and heel segments of the bun to move from their vertical orientation to horizontal orientations in preparation for movement toward the toasting mechanism.

With reference lastly being made to FIG. 10, there is illustrated the bun separator mechanism 196 of the new and improved automated bun handling and toasting system 100 of the present invention, which will effectively separate the crown segment of the bun from the heel segment of the bun and move the separated bun segments from vertically oriented positions to horizontally oriented positions, with the previously internal surfaces of the crown and heel segments of the bun, which faced each other and were in contact with each other when the bun was disposed within the bun storage tube 104 and then moved or pushed along the first platform 187, now disposed in horizontal orientations with both internal faces of the bun segments facing upwardly, in preparation for their further conveyance toward the toasting mechanism. More particularly, as the vertically oriented bun is being moved along the first platform 187, the vertically oriented bun will be delivered onto a second horizontally oriented platform 198. It is seen that the second horizontally oriented platform 198 has a pair of laterally spaced parallel slots 200, 200 defined therein, and that a second pair of laterally spaced vertically oriented guide plates 202, 202 are disposed beneath the second horizontally oriented platform 198. The pair of laterally spaced vertically oriented guide plates 202, 202 are fixedly mounted atop a third horizontally oriented platform or mounting plate 204 wherein one edge portion of the third horizontally oriented platform or mounting plate 204 is fixedly disposed atop a vertically oriented linear actuator 206.

Accordingly, when the bun is first discharged from the bun storage tube 104 so as to engage the circular positioning plate 182, and is about to be moved along the first horizontally oriented platform 187 by means of the pusher plate 188, the linear actuator 206 will be activated so as to move the pair of laterally spaced vertically oriented guide plates 202, 202 to their raised positions such that the pair of laterally spaced vertically oriented guide plates 202, 202 will pass through the pair of laterally spaced parallel slots 200, 200 defined within the second horizontally oriented platform 198. In this manner, the pair of laterally spaced vertically oriented guide plates 202, 202 will define a space or slot into which, or between which, the vertically oriented bun can be inserted as the pusher plate 188 moves or pushes the bun along the first horizontally oriented platform 187 and onto the second horizontally oriented platform 198. It is further noted that each one of the pair of laterally spaced vertically oriented guide plates 202, 202 is provided with a slot or hole 205, 205, and that a proximity sensor 207 is fixedly attached to one side or one end of the second horizontally oriented platform 198. The proximity sensor 207 is adapted to emit a laser beam 208 which is adapted to pass through the pair of holes 205, 205 defined within the pair of laterally spaced vertically oriented guide plates 202, 202 when the pair of laterally spaced vertically oriented guide plate 202, 202 are moved to their elevated positions.

Accordingly, when the bun enters the space or slot defined between the pair of laterally spaced vertically oriented guide plates 202, 202, the laser beam 208 will be interrupted thereby generating a signal that the bun has in fact been properly moved into the space or slot defined between the pair of laterally spaced vertically oriented guide plates 202, 202 whereby the bun is retained in its vertical orientation. This signal also tells the system that the vertically oriented bun, comprising its two, vertically oriented crown and heel segments, is now ready for its crown and heel segments to be separated from each other such that the crown and heel segments will be disposed in their horizontal orientations upon the second horizontally oriented platform 198 with their internal surfaces facing upwardly. It is to be lastly noted that in conjunction with the movement of the bun from the first horizontally oriented platform 187 onto the second horizontally oriented platform 198, a rake mechanism 210 is fixedly attached to the forward end of a dual-action or dual-directional air cylinder actuator 212. It is to be further understood that the air cylinder 212 will be actuated in a first mode so as to move the rake mechanism 210 to its rightwardmost position, as viewed in FIG. 10, prior to the movement of the bun along the first horizontally oriented platform 187 and onto the second horizontally oriented platform 198, and prior to the elevation of the pair of laterally spaced vertically oriented guide plates 202, 202 through the pair of laterally spaced parallel slots 200 defined within the second horizontally oriented platform 198, such that the rake mechanism 210 will be disposed adjacent to the distal edge portion 214 of the second horizontally oriented platform 198, for a purpose which will be better understood momentarily.

It is lastly noted that the bun separator mechanism 196 further includes the actual bun separator implements which comprise a pair of side-by-side gripping tapes or flexible bands 216, 216 which are respectively mounted within a pair of side-by-side gripping tape retainers 218, 218 which, in turn, are mounted upon the undersurface side of an actuator system which comprises a first, horizontally oriented linear actuator 220 which can move the pair of gripping retainers 218, 218 through a short lateral stroke such that the gripping retainers 218, 218, and the gripping tapes or flexible bands 216, 216 carried thereby, can move away from each other and toward each other. The gripping tapes or flexible bands 216, 216 are adapted to respectively engage and grip an upper circumferential segment of each bun half of the bun which has been inserted between the pair of vertically oriented guide plates 202, 202 which therefore maintain the bun within its vertical or upright orientation. In order to achieve this, it is seen that the first, horizontally oriented linear actuator 220 is fixedly mounted upon the lower end of a second vertically oriented linear actuator 222 which can move the entire bun separator mechanism 196 in a vertically upward and vertically downward mode. Accordingly, once the proximity sensor 207 has confirmed the fact that a bun has in fact been inserted between the vertically oriented guide plates 202, 202, the vertically oriented linear actuator 222 will be activated so as to lower the entire bun separator mechanism 196 whereby the gripping tapes or flexible bands 216, 216 can now in fact engage the upper circumferential or peripheral edge segments of the bun halves. Once this is achieved, the pair of vertically oriented guide plates 202, 202 will be lowered by means of the linear actuator 206 so as to now be disposed beneath the second horizontally oriented platform 198. Subsequently, the first horizontally oriented linear actuator 220 is activated so as to move the gripping retainers 218, 218 horizontally or laterally away from each other, thereby permitting or causing the bun segments to fall away from each other and be disposed upon the second horizontally oriented platform 198 in a horizontal orientation with the internal faces of the bun segments oriented upwardly. It is noted that a pair of proximity sensors 224, only one of which is visible, are mounted upon opposte ends of a suitable mounting bracket 226 which, in turn, is mounted upon the vertically oriented linear actuator 222. The proximity sensors 224 will emit two laser beams 225, 227 which will detect the proper presence and disposition of the two horizontally oriented bun halves disposed upon the second horizontally oriented platform 198. If, for some reason, the bun segments were not in fact properly separated and/or properly positioned upon the second horizontally oriented platform 198 as would be detected by means of the proximity sensor laser beams 225, 227, then the second horizontally oriented platform 198 would be tilted downwardly such that the defective bun segments, having not been properly separated and positioned upon the second horizontally oriented platform 198, would effectively move past the distal edge portion 214 of the second horizontally oriented platform 198 and discarded into a reject bin, not shown.

To the contrary, if the bun segments are in fact properly separated and positioned upon the second horizontally oriented platform 198, as confirmed by means of the laser beams 225, 227 generated from the pair of proximity sensors 224, then the air cylinder 212 would be actuated so as to move the rake mechanism 210 from its rightwardmost position toward its leftward most position, as illustrated within FIG. 10, whereby the rake mechanism 210 would push the separated, horizontally oriented bun segments across the second horizontally oriented platform 198 and onto a downwardly inclined ramp 230 which, in turn, will effectively feed the bun segments onto the horizontally oriented conveyor 106 for conveying the bun segments through the horizontally oriented toasting mechanism 108 where the bun segments can be toasted to a predetermined degree in preparation for use within hamburger sandwiches or the like. Subsequently, the air cylinder 212 will return the rake mechanism 210 to its rightwardmost position for operation within a new operative cycle as has been described.

Obviously, many variations and modifications of the present invention are possible in light of the above teachings. For example, while the new and improved automated bun handling and toasting system has been described in connection with horizontally oriented toasting mechanisms or appliances, the system can likewise be adapted for use with vertically oriented toasting mechanisms or appliances. In addition, the bun separator mechanism could be adapted so as to effectively place the bun segments upon the second horizontally oriented platform with the internal faces of the bun segments facing downwardly as opposed to upwardly. Still yet further, it is to be appreciated that the new and improved automated bun handling and toasting system is a modular system which can be utilized with other food processing components of a food preparation line, such as, for example, a condiment dispensing station, a packaging station, and the like. It is therefore to be understood that within the scope of the appended claims, the present invention may be practiced otherwise than as specifically described herein.

What is claimed as new and desired to be protected by Letters Patent, is:

1. A new and improved automated bun handling and toasting system, comprising:

a plurality of buns comprising at least one crown bun segment and at least one heel bun segment wherein said at least one crown bun segment comprises a main curved surface and a peripheral surface, while said at least one heel bun segment comprises at least one flat main surface and a peripheral surface;

a plurality of horizontally oriented bun storage tubes mounted upon a carousel, wherein each one of said plurality of horizontally oriented bun storage tubes, mounted upon said carousel, houses said plurality of buns comprising said at least one crown bun segment and said at least one heel bun segment such that said peripheral surfaces of said at least one crown bun segment and said at least one heel bun segment are disposed in contact with inner peripheral surface portions of each one of said plurality of bun storage tubes, and wherein said main curved surface of said at least crown bun segment is disposed in surface-to-surface contact with a crown surface or heel surface of another at least one crown bun segment or another at least one heel bun segment;

an indexing system operatively connected to said carousel so as to rotate said carousel in a predetermined incremental manner and thereby dispose a particular one of said plurality of horizontally oriented bun storage tubes at a predetermined discharge position;

a bun pusher operatively associated with said particular one of said plurality of bun storage tubes located at said predetermined discharge position for discharging a bun from said particular one of said plurality of bun storage tubes;

at least one toaster appliance for receiving bun segments discharged from said particular one of said plurality of bun storage tubes and for toasting the bun segments discharged from said particular one of said plurality of bun storage tubes to a predetermined degree; and a conveyor system for conveying the bun segments discharged from said particular one of said plurality of bun storage tubes toward said at least one toaster appliance.

2. The new and improved automated bun handling and toasting system as set forth in claim 1, wherein:
said indexing system comprises a Geneva drive mechanism; and
a motor drive having a motor drive shaft operatively connected to said Geneva drive mechanism such that for every complete rotation of said motor drive shaft, said Geneva drive mechanism will rotate said carousel one incremental step so as to rotate another bun storage tube to said predetermined discharge position.

3. The new and improved automated bun handling and toasting system as set forth in claim 2, wherein:
said plurality of horizontally oriented bun storage tubes mounted upon said carousel comprises eight bun storage tubes whereby said Geneva drive mechanism is capable of rotating said carousel in an incremental manner so as to position any one of said eight bun storage tubes at said predetermined discharge position.

4. The new and improved automated bun handling and toasting system as set forth in claim 2, wherein:
said plurality of horizontally oriented bun storage tubes mounted upon said carousel comprises twelve bun storage tubes whereby said Geneva drive mechanism is capable of rotating said carousel in an incremental manner so as to position any one of said twelve bun storage tubes at said predetermined discharge position.

5. The new and improved automated bun handling and toasting system as set forth in claim 2, further comprising:
a proximity sensor operatively associated with said Geneva drive mechanism so as to define said predetermined discharge position.

6. The new and improved automated bun handling and toasting system as set forth in claim 1, wherein:
each one of said bun storage tubes comprises a bun tube puck for engaging a rearwardmost bun of said plurality of buns disposed within said bun storage tube; and
said bun pusher operatively associated with said particular one of said plurality of bun storage tubes located at said predetermined discharge position for discharging a bun segment from said particular one of said plurality of bun storage tubes comprises a pusher block for engaging said bun tube puck, a rigid chain attached to said pusher block, and a rotary drive motor/sprocket assembly for incrementally driving said rigid chain so as to incrementally move said pusher block and said bun tube puck so as to discharge a leading bun from said bun storage tube located at said predetermined discharge position.

7. The new and improved automated bun handling and toasting system as set forth in claim 6, wherein:
each one of said plurality of bun storage tubes is open at its front end; and
an annular plate is disposed immediately adjacent to said front ends of said plurality of bun storage tubes so as to effectively close said front ends of said plurality of bun storage tubes except for said bun storage tube disposed at said predetermined discharge position so as to permit a leading bun to be discharged from said bun storage tube disposed at said predetermined discharge position.

8. The new and improved automated bun handling and toasting system as set forth in claim 7, further comprising:
a positioning disk disposed at said predetermined discharge position so as to engage a front end portion of said bun being discharged from said bun storage tube disposed at said predetermined discharge position whereby said leading bun is maintained in a vertical orientation as a result of being interposed between remaining buns disposed within said bun storage tube disposed at said predetermined discharge position and said positioning disk, or between said bun tube puck and said positioning disk if said bun being discharged at said predetermined discharge position is the last bun disposed within said bun storage tube disposed at said predetermined discharge position.

9. The new and improved automated bun handling and toasting system as set forth in claim 8, further comprising:
an air actuator operatively connected to said positioning disk so as to move said positioning disk forward into engagement with said bun being discharged from said bun storage tube located at said predetermined discharge position, and for permitting said positioning disk to be moved backwardly as said bun is being discharged from said bun storage tube located at said predetermined discharge position.

10. The new and improved automated bun handling and toasting system as set forth in claim 8, further comprising:
a first horizontally oriented platform upon which said bun, discharged from said bun storage tube disposed at said predetermined discharge position, is supported as said bun, discharged from said bun storage tube disposed at said predetermined discharge position, engages said positioning disk;
a first pair of vertically oriented guide plates extending upwardly from said first horizontally oriented platform, spaced from each other so as to accommodate said discharged bun disposed upon said first horizontally oriented platform, and disposed upon a first side of said positioning disk; and a pusher plate disposed upon a second opposite side of said positioning disk for moving said bun, discharged from said bun storage tube disposed at said predetermined discharge position, toward a bun separator.

11. The new and improved automated bun handling and toasting system as set forth in claim 10, further comprising:

a linear actuator operatively connected to said pusher plate for moving said pusher plate forwardly and backwardly.

12. The new and improved automated bun handling and toasting system as set forth in claim 11, wherein:

said linear actuator comprises a chain linear actuator.

13. The new and improved automated bun handling and toasting system as set forth in claim 11, further comprising:

a motor drive for driving said linear actuator.

14. The new and improved automated bun handling and toasting system as set forth in claim 10, wherein said bun separator comprises:

a bun separator for separating said crown bun segment from said heel bun segment, and for permitting said crown and heel bun segments, comprising said bun discharged from said bun storage tube at said predetermined discharge position, to be moved from vertical orientations to horizontal orientations with internal surfaces of said crown and heel bun segments facing upwardly.

15. The new and improved automated bun handling and toasting system as set forth in claim 14, wherein said bun separator further comprises:

a second horizontally oriented platform onto which said bun, discharged from said bun storage tube at said predetermined discharge position and moved toward said bun separator by said pusher plate, is to be delivered by said pusher plate;

a pair of laterally spaced slots defined within said second horizontally oriented platform;

a second pair of vertically oriented guide plates disposed beneath said second horizontally oriented platform; and a linear actuator for moving said second pair of vertically oriented guide plates with respect to said second horizontally oriented platform such that when said second pair of vertically oriented guide plates are elevated, said second pair of vertically oriented guide plates will pass through said pair of laterally spaced slots defined within said second horizontally oriented platform so as to define a space to accommodate said bun, discharged from said bun storage tube and delivered onto said second horizontally oriented platform by said pusher plate, so as to maintain said bun in its vertical orientation.

16. The new and improved automated bun handling and toasting system as set forth in claim 15, wherein said bun separator comprises:

a first horizontally oriented linear actuator;

a pair of laterally spaced tapes/bands, mounted upon said first horizontally oriented linear actuator, for engaging and gripping external peripheral surface portions of said crown and heel bun segments; and a second vertically oriented linear actuator, whereby, when said second vertically oriented linear actuator is actuated so as to lower said first horizontally oriented linear actuator and said pair of laterally spaced tapes/bands mounted thereon, said pair of laterally spaced tapes/bands engage and grip said peripheral edge portions of said crown and heel bun segments, when said linear actuator, for moving said second pair of vertically oriented guide plates with respect to said second horizontally oriented platform, is actuated so as to lower said second pair of vertically oriented guide plates such that said second pair of vertically oriented guide plates no longer extend through said pair of laterally spaced slots defined within said second horizontally oriented platform, and when said first horizontally oriented linear actuator is actuated so as to move said tapes/bands away from each other, said crown and heel bun segments of said bun, discharged from said bun storage tube, will fall onto said second horizontally oriented platform and be disposed in horizontal orientations with said internal faces of said crown and heel bun segments facing upwardly.

17. The new and improved automated bun handling and toasting system as set forth in claim 15, further comprising:

a pair of proximity sensors mounted upon said first vertically oriented linear actuator for ensuring that said crown and heel bun segments are properly disposed upon said second horizontally oriented platform in their horizontal orientations with said internal faces of said crown and heel bun segments facing upwardly.

18. The new and improved automated bun handling and toasting system as set forth in claim 15, wherein:

each one of said second pair of vertically oriented guide plates has an aperture formed therein; and a proximity sensor is mounted upon said second horizontally oriented platform for detecting the presence of said bun, discharged from said bun storage tube, between said second pair of vertically oriented guide plates.

19. The new and improved automated bun handling and toasting system as set forth in claim 15, further comprising:

a rake operatively associated with said second horizontally oriented platform for moving said crown and heel bun segments from said second horizontally oriented platform and onto said conveyor such that said crown and heel bun segments are moved toward said at least one toaster appliance.

20. The new and improved automated bun handling and toasting system as set forth in claim 19, further comprising:

an air cylinder operatively connected to said rake for moving said rake back and forth across said second horizontally oriented platform during cyclical operations.

21. The new and improved automated bun handling and toasting system as set forth in claim 15, wherein:

said conveyor system comprises a downwardly inclined ramp extending from said second horizontally oriented platform toward said toaster appliance.

22. The new and improved automated bun handling and toasting system as set forth in claim 1, wherein:

said at least one toaster appliance comprises a horizontally oriented toaster appliance; and at least one endless conveyor disposed internally of said at least one toaster appliance for conveying said crown and bun segments through said at least one toaster appliance such that said crown and bun segments are toasted to a predetermined degree.

23. A new and improved automated bun handling and toasting system, comprising:

a plurality of buns comprising at least one crown bun segment and at least one heel bun segment wherein said at least crown segment comprises a main curved surface and a peripheral surface, while said at least one heel bun segment comprises at least one flat main surface and a peripheral surface;

a plurality of horizontally oriented bun storage tubes mounted upon a carousel, wherein each one of said plurality of horizontally oriented bun storage tubes, mounted upon said carousel, houses said plurality of buns comprising said at least one crown bun segment and said at least one heel bun segment such that said peripheral surfaces of said at least one crown bun segment and said at least one heel bun segment are disposed in contact with inner peripheral surface portions of each one of said plurality of bun storage tubes, and wherein said main curved surface of said at least crown bun segment is disposed in surface-to-surface contact with a crown surface or heel surface of another at least one crown bun segment or another at least one heel bun segment;

a bun pusher operatively associated with a particular one of said plurality of bun storage tubes located at a predetermined discharge position for discharging a bun from said particular one of said plurality of bun storage tubes wherein said discharged bun has a vertical orientation;

a bun separator for separating said discharged bun, disposed in said vertical orientation, into crown and heel bun segments disposed in horizontal orientations;

at least one toaster appliance for receiving said separated bun segments disposed in said horizontal orientations from said bun separator so as to toast said bun segments to a predetermined degree; and a conveyor system for conveying said bun segments, disposed in said horizontal orientations, from said bun separator toward said at least one toaster appliance.

24. A new and improved automated method for handling and toasting buns, comprising the steps of:

providing a plurality of buns comprising at least one crown bun segment and at least one heel bun segment wherein said at least one crown bun segment comprises a main curved surface and a peripheral surface, while said at least one heel bun segment comprises at least one flat main surface and a peripheral surface;

providing a plurality of horizontally oriented bun storage tubes mounted upon a carousel, wherein each one of said plurality of horizontally oriented bun storage tubes, mounted upon said carousel, houses said plurality of buns comprising said at least one crown bun segment and said at least one heel bun segment such that said peripheral surfaces of said at least one crown bun segment and said at least one heel bun segment are disposed in contact with inner peripheral surface portions of each one of said plurality of bun storage tubes, and wherein said main curved surface of said at least crown bun segment is disposed in surface-to-surface contact with a crown surface or heel surface of another at least one crown bun segment or at least one heel bun segment;

providing a bun pusher operatively associated with a particular one of said plurality of bun storage tubes located at a predetermined discharge position for discharging a bun from said particular one of said plurality of bun storage tubes wherein said discharged bun has a vertical orientation;

separating said discharged bun, disposed in said vertical orientation, into crown and heel bun segments such that said crown and heel bun segments are now disposed in horizontal orientations;

conveying said separated bun segments, disposed in said horizontal orientations, toward at least one toaster appliance; and toasting said separated bun segments, disposed in said horizontal orientations, to a predetermined degree.

* * * * *